United States Patent

Prime

[19]

[11] Patent Number: 5,955,018
[45] Date of Patent: Sep. 21, 1999

[54] METHOD AND APPARATUS FOR FORMING AND BINDING NATURAL EVERGREEN WREATHS

[76] Inventor: Daniel G. Prime, Box 1302, Newdam Rd., Sanford, Me. 04073

[21] Appl. No.: 08/763,096

[22] Filed: Dec. 7, 1996

[51] Int. Cl.[6] .............................. B29C 53/00; A41G 1/00
[52] U.S. Cl. .............................. 264/163; 100/3; 264/320; 428/10
[58] Field of Search ................... 428/10; 100/2, 100/3, 6, 15; 264/163, 320

[56] References Cited

U.S. PATENT DOCUMENTS

| 2,634,532 | 4/1953 | Englert ........................................ 100/3 |
| 3,511,736 | 5/1970 | Nielsen, Jr. et al. |
| 3,591,442 | 7/1971 | Matesi ........................................ 428/10 |
| 4,100,316 | 7/1978 | Lackey ........................................ 428/10 |
| 5,503,883 | 4/1996 | Kell, Jr. et al. ............................ 428/10 |

*Primary Examiner*—Mathieu D. Vargot

[57] ABSTRACT

A bio-degradable natural wreath has self-supporting bough branches individually held shaped and bound together in a bough cradle while such branches are under compression. Bough compression arms are controllably lowered to interleave with a similar series of shaping fingers forming a branch cradle that allows branch stems to be tied together. Such bound branch stems allows the branches to remain in their natural state for longer freshness than wreaths formed by evergreen tips and branch stubs that are wired or glued to support rings. The formed and bound bio-degradable wreath is removed from the wreath mold by removal of the compression arms and by lifting the finished wreath from a center post.

10 Claims, 5 Drawing Sheets

METHOD AND APPARATUS FOR FORMING AND BINDING NATURAL EVERGREEN WREATHS

BACKGROUND OF THE INVENTION

1. Field of the Invention

The field of the invention relates to a method and apparatus for compressively forming evergreen boughs into a compact circular wreath-shaped mold. In a more limited sense, the field of the invention relates to a manual or pneumatic shaping and compression of natural evergreen boughs in a mold formed by a series of interleaved radial bough shaping and compression forming fingers/arms that allow a user to shape a wreath by held and overlaid branches and to bind the wreath while the formed wreath boughs are under compression.

2. Definition of Terms

Wreath Mold

A combined shaping, compressing and binding mold in the circular shape of a wreath to be formed is separable into upper and lower circular form portions. The lower form portion includes a series of elongated upstanding wreath forming fingers that radially define a bough cradle, and a similar upper coaxially located series of slidable bough compression arms radially define an upper mold form. The upper form portion is both removable and moveable in an up/down direction during the wreath making process of the invention.

Wreath Forming Fingers

These fingers, like spokes of a wheel, spread out from a vertical axis center to form an open, circular upstanding trough having a bottom and two sides. The open trough serves as a bough cradle, and has an outer periphery shaped as an open outward branch-receiving bow on the cradle. The inner periphery of the cradle includes an inwardly sloped upstanding guide bar, which bar forms the inner side of the trough. A series of such fingers are equally and radially spaced from the center and are mounted on a raised mounting bed for receiving bough branches from which a self-supporting, bio-degradable wreath is made.

Bough Cradle and Bough Branch Overlay

A circular bough cradle is formed by a series of spaced radial wreath forming fingers, each finger being equipped with an integral bough branch opening therein for securely holding the non-tipped end of a natural evergreen branch—pine, spruce, or the like—with an orientation such that the tipped end of the branch may be guided into a circular curve within several cradle fingers. Each succeeding radial finger in the cradle both holds and guides another individual branch into the cradle where these bough branches overlay one another in preparation for a bough compression step.

Depending upon the branch length, at least several branch stems lie circumferentially adjacent one another within several trough fingers where they may be bound together to form a self-supporting integral stem ring for the wreath. After a wreath has been formed, compressed and the branch stems have been securely bound together, the end of the branch boughs, at the branch holding openings, are cut off by snips so that the wreath may be released and removed from the mold.

Compression Arms

This invention includes a small upstanding vertical post that may be driven manually or pneumatically in a controlled up and down motion. Radially spaced on a circular mounting plate for removable placement above the bough cradle are a series of downwardly curved compression arms. Such arms radiate outwardly from a post opening located at the plate's center. For initial branch loading, the arms are not in place and the post has been lowered out of the way.

After bough loading, the compression arms are placed on the post for a controlled raising and lowering wreath making and removal process. The outermost ends of these compression arms overlap and extend slightly beyond the outer periphery of the bough cradle such that the bough branches become compressively shaped in a circular wreath mold when the compression arms are lowered by the post.

Bio-degradable Wreath and Wreath Bindings

The wreaths of this invention are totally bio-degradable and rely upon the bound together branches themselves for support, rather than relying on any extra supporting ring. When the bough branches have been compressed in the cradle, a series of tie-off spaces are presented between the interleaved fingers and arms. A wreath master simply ties the shaped branches into a compressed circular cross-sectional form by using a series of spaced bio-degradable twine pieces.

After the branches have been tied, the branches are cut from the branch holding openings on the individual wreath forming fingers, and the post is raised so that the compression arms may be removed from the top of the post. Such arms are normally held in place by the presence and/or release of a quick disconnect retaining pin. The formed and bound wreath is easily and readily removed from the wreath mold after the compression arms have been removed from the post.

DESCRIPTION OF PRIOR ART

Christmas holidays would not be complete without wreaths serving as season greetings on the entrance ways of most homes, apartments, stores and work places. The scent of fresh cut evergreen boughs is as welcoming as the natural beauty which comes from decorating with such wreaths. Today, even during non-holiday times, many interior decorators seek to incorporate wreaths into their decoration themes.

As a result of such high demand, the practice of natural wreath making has increased steadily. At the same time, however, concerns over the environment have mounted to the point that a totally bio-degradable wreath is a much sought after decorating item. Particularly during the Christmas holidays, wreath making must be accomplished both by high productivity and full, natural looking bio-degradable wreaths that remain fresh throughout the holiday season.

Most natural wreath making is done by hand and involves a circular metal, plastic, wire or similar sturdy circular core that is used as the central supporting structure for a hand fashioned wreath. Evergreen tips are subsequently wired or glued to this rigid core in an effort to supply body to the fashioned wreath. Such wreaths are not bio-degradable and the cut tips do not remain fresh very long. Fashioning such wreaths by hand is also relatively slow, tedious and cumbersome.

Machines have been developed with a flat table having a wire wrapping mechanism centrally mounted at the wreath's hub. Again central wire or similar supports are used and evergreen tips are wired in place on the wreath support ring by the wrapping mechanism as it wraps wire around the tips to bind them to the supporting core. Such wreaths are not bio-degradable nor do they remain fresh for any extended time period. Additionally, such wreaths—although higher in production capability than the hand fashioned ones—do not have much body and the use of tips tends to increase the production difficulties while decreasing the lasting time.

In short, what has not yet been heretofore supplied is a simple, highly productive natural wreath making approach that provides totally bio-degradable wreaths that are self supporting, long lasting and full bodied with a natural look. Such an approach is presented by this invention which discloses and claims both a method and apparatus that was not heretofore known in the art.

SUMMARY OF THE INVENTION

Apparatus is provided for making a self supporting natural wreath from overlaid evergreen branch boughs, which machine includes an upright center post located at the center of the wreath to be fashioned. This post holds a controllably separable bough compression, shaping and binding mold. The mold includes a lower bough receiving cradle and a removable upper compression cradle. Both cradles are formed from sturdy steel stock in the form of radial spokes of unique design.

The lower bough cradle is formed by spaced radial bough forming fingers that emanate outwardly from the post. Evergreen bough branches are individually held in branch openings formed in the radial bough forming fingers. These openings in each finger face toward the adjacent cradle finger. This opening tends to guide a held branch into the cradle so that several such branches may be overlaid in the cradle.

For loading the evergreen branches, the upper form is removed, and the post is lowered. These conditions allows the branches to fill the lower cradle without interference. After the lower cradle is filled, the upper form is placed over the top of the post.

Coaxially located above the bough cradle, and controllably moveable in an up/down direction, are a mating series of bough compression arms which also emanate outwardly from the post and interleave with the lower cradle for compressively shaping the branches into a finished wreath. Wreath tying openings are present between the interleaved fingers; and, while such branches are under compression, the wreath shape is maintained by tying the wreath with bio-degradable twine at several spaced tying locations.

The method of this invention yields a totally bio-degradable natural material wreath made in a self-supporting manner by bough branches that are individually held by fingers forming a bough cradle in which such evergreen branches are overlaid with one another. The bough compression arms are controllably lowered such that the upper arms interleave with the lower fingers to compressively shape the wreath from the overlaid evergreen branches. After the adjacent branches spanning several fingers have been bound together, the post and upper compression arms are raised and the compression arms are subsequently removed by removal of a quick disconnect pin. The formed and bound bio-degradable wreath is removed from the wreath mold by lifting same over the top of the raised post.

Accordingly, the method and apparatus of this invention provides a self supporting natural wreath that is totally bio-degradable and has a substantial body made from bound together bough branches. Such bound branch stems allows the branches to remain in their natural state and thus provides a wreath that has longer freshness and is more full bodied than those formed by evergreen tips and branch stubs that have been wired or glued to support rings.

OBJECTS OF THE INVENTION

It is an object of the invention to provide a high production natural wreath-making apparatus having a bough shaping, compression and binding mold.

It is a further object of the invention to provide a bough cradle for holding individual branches used in making an overlaid, self supporting evergreen branch wreath.

It is an additional object of the invention to shape and compressively bind a natural wreath in an interleaved bough compression cradle having openings for holding individual bough branches and guiding such branches into adjacent fingers of the cradle It is one additional object of the invention to provide a method of overlaying, compressing and binding natural evergreen branches in a self-supporting totally bio-degradable wreath.

It is a further object of the invention to interleave radial bough forming fingers with bough compression arms both centered on a common vertically controlled post used to form the natural wreath of the invention.

It is still one further object of the invention to provide a totally bio-degradable wreath made from compressed branches, which branches includes several twine-bound branch stems that are bound together in a self supporting circle without the use of any support ring or wire ties.

It is another object of the invention to compressively hold bough branches in a shaped wreath which includes several branch stems that are bound together by bio-degradable twine while the branches are in a compressed form.

It is an final object of the invention to provide a quick removal of the compression arms from an upper portion of a wreath mold in order to free the bound wreath for removal from the molding apparatus of the invention.

BRIEF DESCRIPTION OF DRAWING

FIGS. 3A and 3B respectively are a top and side view of the wreath forming fingers and the mold table of FIG. 2;

DESCRIPTION OF PREFERRED EMBODIMENT (S)

FIGS. 1, 2, 3A, 3B, 4A, 4B, 5 and 6 respectively present views which will lead to a full and complete understanding of the basic principles of this, my invention. Disclosed therein is apparatus 200 for making a self supporting, natural bio-degradable wreath 10 from overlaid evergreen branch boughs 11, 12, etc. These bough branches 11, 12 are shaped in a separable mold form having upper and lower separable mold sections. Only the lower mold form 25 is partially shown in FIG. 1.

Figure 1:
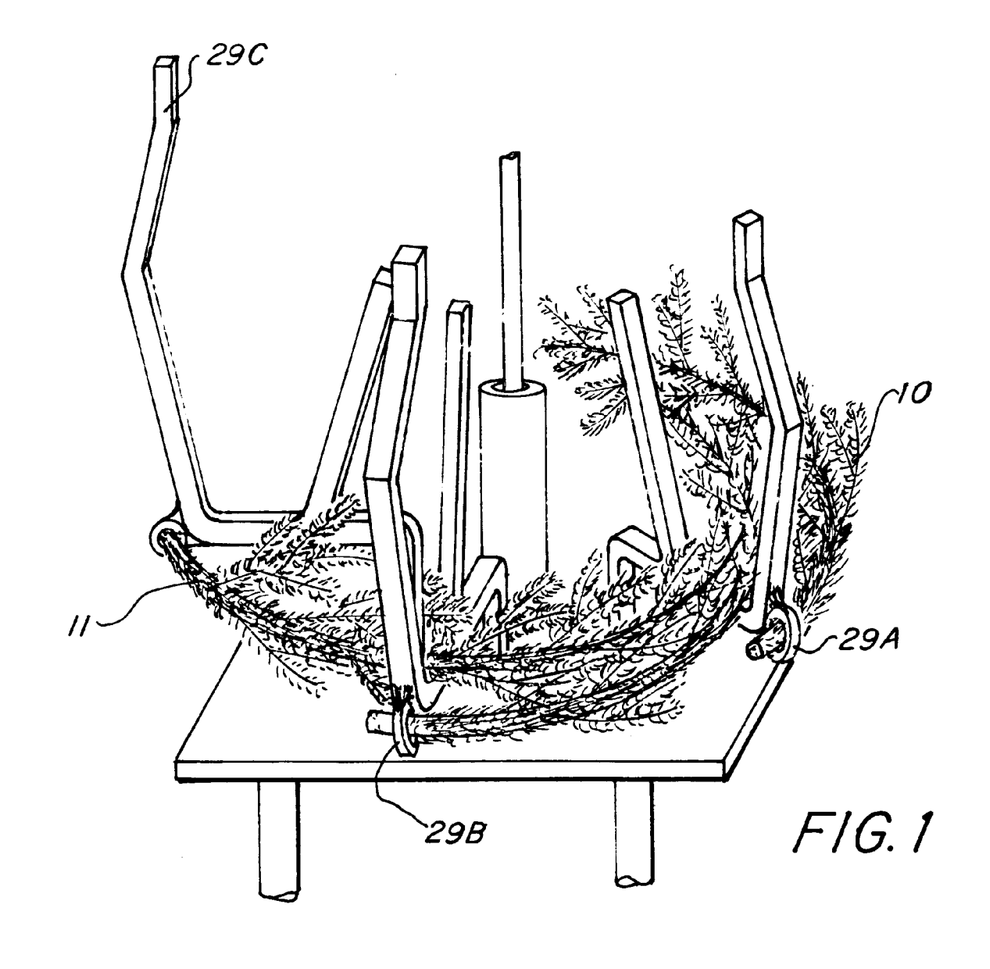
FIG. 1 is a top perspective showing a wreath being formed from evergreen branches held by, guided into and overlaid in a lower mold trough of the apparatus of my invention.
Figure 2:
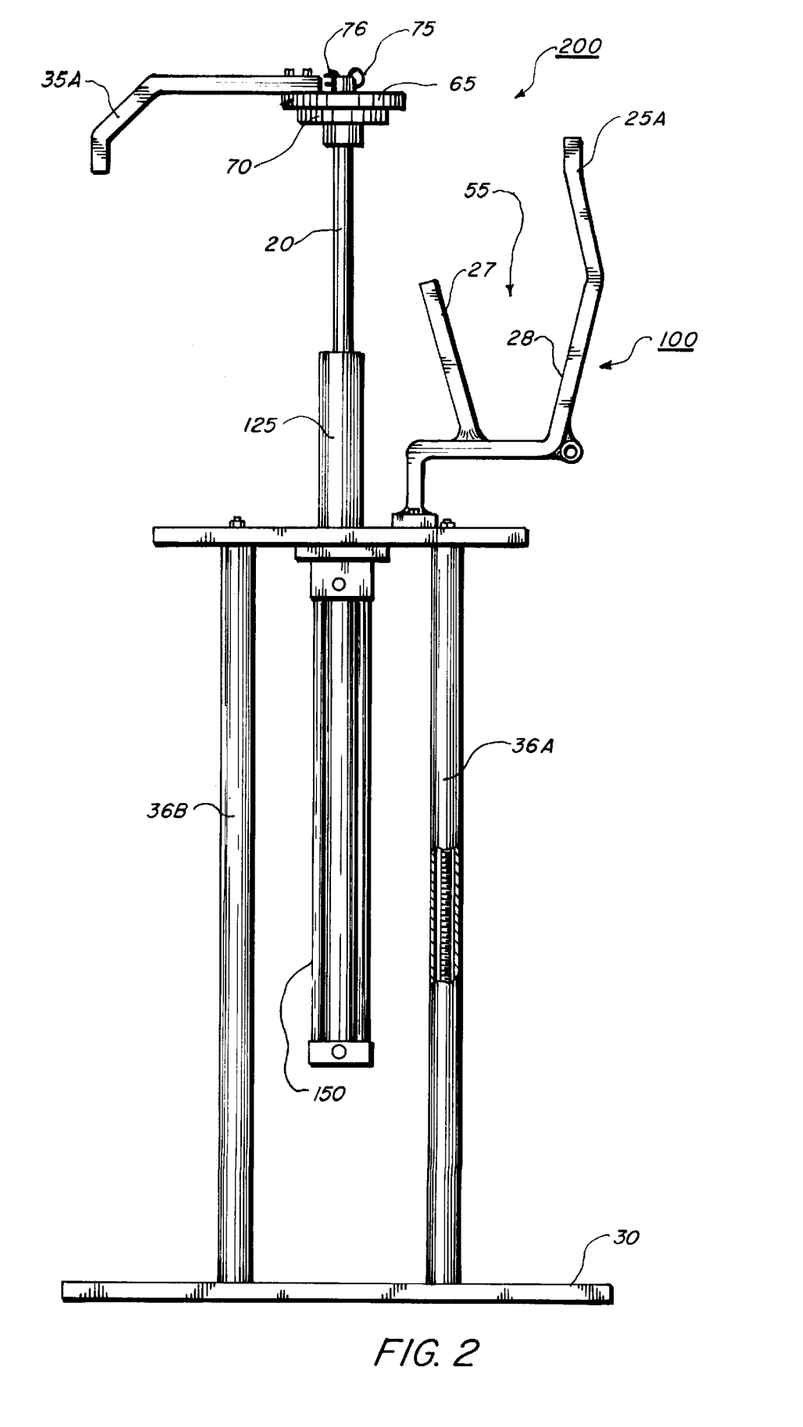
FIG. 2 is a side view of my new wreath forming mold machine.

Turning now to FIGS. 1 and 2, mold 100 is shown as having an upper and lower half for encasing a wreath 10 that is formed, shaped and bound from self-supporting branches 10, 11 which are overlaid in mold 100. The apparatus 200 of my invention includes an upright center post 20 located with a vertical longitudinal axis at the center 15 of the wreath to be fashioned.

Post 20 holds a bough compression, shaping and binding mold 100. The upper half of my mold is formed from radial compression arms 35 which, when closed, are interleaved with an equal number of lower radial bough forming fingers 25. These two halves 25, 35 of mold 100 are opened and closed by vertical movement of post 20. Such movement may be manually or via a ram 150 as described in more detail hereinafter.

FIG. 2 depicts a front view of my wreath making mold table 50 which has a single wreath forming finger 25 and a bough compression arm 35 shown in detail. In FIG. 2, for clarity purposes, detailed side views of one finger 25A and one compression arm 35A only are shown in a separated position, with the understanding that several such fingers and arms are radially arranged around a common center. The number of such arms/fingers depends primarily on the size of wreath to be formed.

For example, finger 25A may be one of five separate fingers 25A, 25B, through 25E as shown in the top view of FIG. 3A. A series consisting of five fingers has proven very acceptable for wreaths in the sixteen to eighteen inch diameter category. Larger sized wreaths, in the order of thirty-four to thirty-six inches in diameter, require about eight equally spaced such interleaved fingers/arms.

These fingers 25A, 25B are mounted on plates 26A, 26B, etc. which plates in turn are centered on an upper forming table 45 and are bolted or otherwise fastened thereto. Each finger forms one spoke of a bough trough 55 shown generally by dashed circles in FIG. 3A. Bough cradle 55 is thus formed like spokes on a wheel wherein the spokes are the individual shaping fingers. Such radial fingers emanate from the center point 15 and are essentially U-shaped when viewed from the side.

The U-shape of the individual radial bough forming fingers define, within their upstanding sides, a branch trough 55 having inner and outer concentric circles coinciding with the vertical sides of these U-shaped radial fingers. Bough trough 55 receives the branches from which the wreath is to be formed. Each finger 25A, 25B has an associated branch holding opening 29A, 29B formed therein at the outer bottom corner of the trough.

Opening 29A faces the adjacent fingers 29B such that a branch inserted in opening 29A is guided into the branch trough 55. That branch held in opening 29A is supple and the user simply curves the non-held remainder of the branch so that it is confined by succeeding bough fingers. Thus, as shown in FIG. 1, branch 10 is confined within several fingers 29B, 29C, 29D of the bough cradle 55.

Figure 3B:
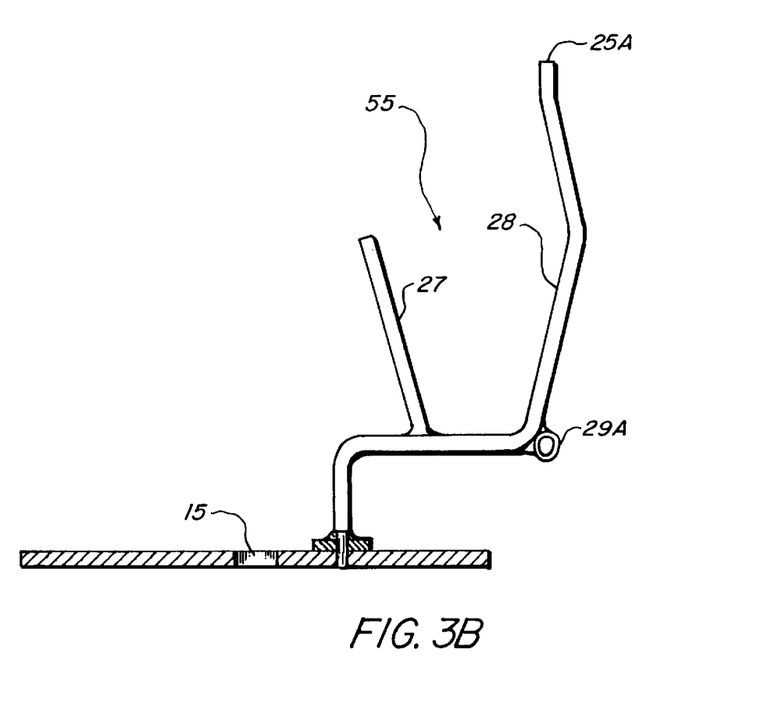

FIG. 3B shows, in detail, the bends placed in the finger 25A as required for shaping a wreath from branches that are deposited in the bough trough 55, FIG. 3A. Each finger 25A includes a branch opening 29A that receives the cut trunk end of a branch stem. With the stem held in place the branch is swirled within the bough trough, or cradle formed from the series of radial fingers.

Finger 25A includes an open sloped U-shaped trough that has both inner and outer sloped sides 27, 28. The outer side 28 of the trough, or branch cradle 55, is considerably higher than the inner side 27. Additionally, outer side 28 is slightly bowed in an outward direction as shown by the bend in FIG. 3B. That increased height and bow shape serves to catch and restrain the loose ends of bough branches as the user bends them in an overlaying fashion into cradle 55 formed by the fingers 25A, 25B through 25E.

Figure 4A:
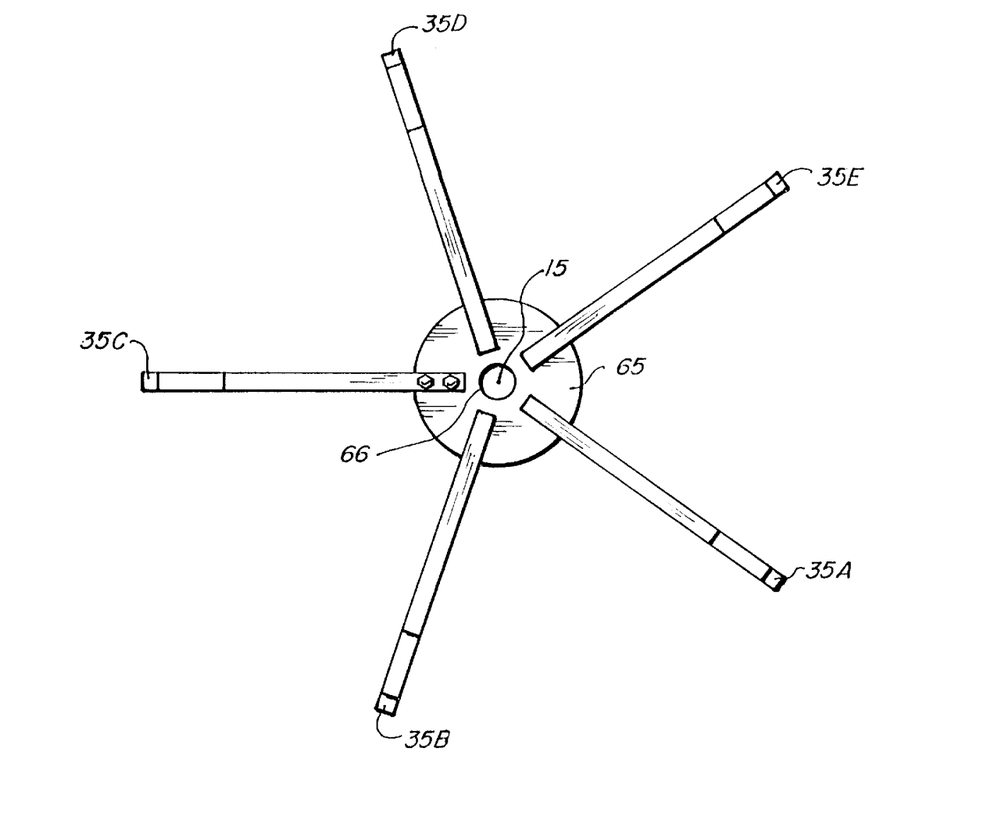
FIGS. 4A and 4B respectively are a top and side view of the bough compression arms and cap plate of FIG. 2.
Figure 4B:
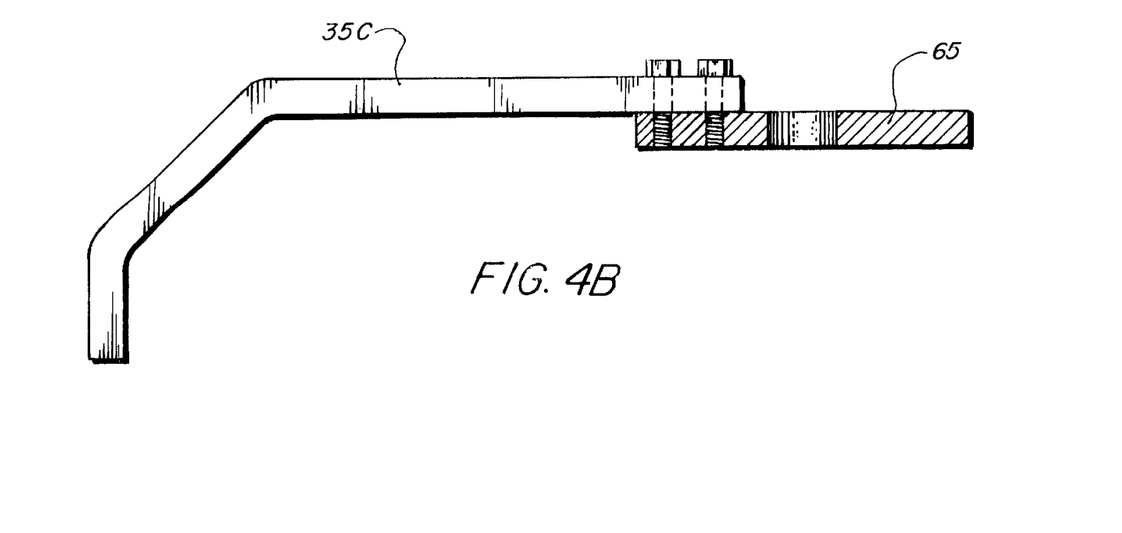

FIG. 4B is a side view of one compression arm 35A. A number of compression arms 35A, 35B, etc. equal in number to the number of shaping fingers 25 are employed. Only one compression arm 35A is shown in detail in FIG. 4B. The series of arms 35 radiate outwardly from a center cap mounting plate 65. Each arm is bolted or otherwise fastened to cap 65 and such arms are radially spaced at equal angle amounts from a center 15.

Cap 65, FIGS. 4B and 2, includes a central opening 66 therethrough, which opening fits over the top of post 20. Cap 65, when slipped over post 20, rests on a collar 70 that is integrally screwed to or otherwise affixed near the top of post 20. In FIG. 2, a quick disconnect key 75 is shown exploded away from the top of post 20. That key 75 serves as a retaining ring that may readily be removed as desired.

With key 75 in place through a horizontal opening 76 in the top of post 20, then the key acts as a retaining pin to keep the compression arms securely on top of post 20 so that they move up and down as post 20 moves. When a wreath has been formed, the key 75 is quickly slipped out, and the compression arms are lifted away from collar 70 on post 20 so that the bound wreath may readily be removed from the wreath mold 100.

Coaxially located above the bough cradle, and controllably moveable in an up/down direction, are a mating series of bough compression arms 35A, 35B, 35C, 35D through 35E which also emanate outwardly from post 20 and interleave with the lower cradle for compressively shaping bough branches 10, 11, etc. that are individually held by the radial bough forming finger openings 29A through 29E after such branches are overlaid in the branch cradle 55.

Figure 5:
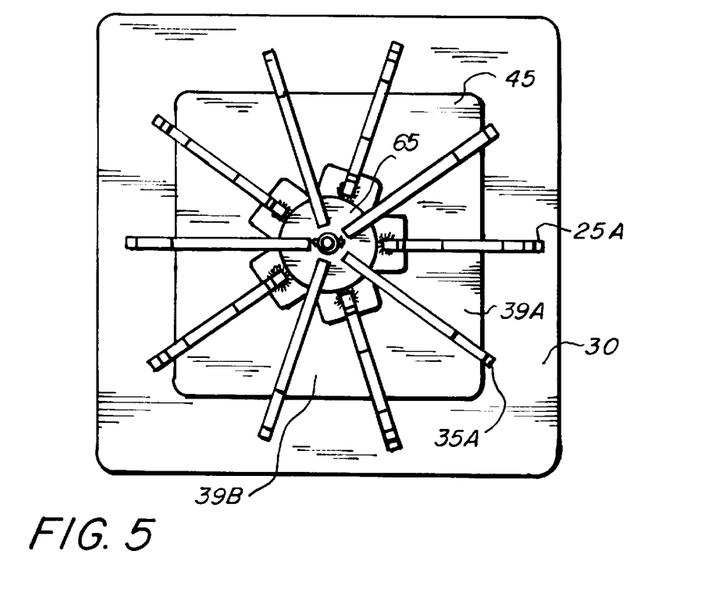
FIG. 5 is a top view of FIG. 2, showing the interleaved form fingers and compression arms, a mold mounting table and a base plate.

FIG. 5 shows a top view of the interleaved arms and fingers looking down on the circular plate 65 and mounting table 45 and base plate 30. Base plate 30 rests on a floor surface and holds mounting table 45 at about waist height by a series of four legs 36A, 36B, 36C and 36D. These legs may simply be equal lengths of pipe sections receiving threaded rods which are bolted together at the upper and lower ends in order to form the mounting table structure 45 for the machine 200.

In one embodiment, the upper mold section 35 may be lowered manually by a threaded crank that extends above the cradle and runs the upper compression arms 35 down along post 20. In such an embodiment, the plate 65 has an oversized opening 66 so that mold 35 simply drops down to a compression position when placed over post 20. Post 20 is threaded and a mating thread on a crank arm allows the arms 35 to turn and run up and down post 20 as the threads advance. sufficient cranking force will allow upper form 35 to be compressed against the branches in cradle 25 when the crank is threaded in a downward direction. Such a manual operation is believed to be clearly understood without any further drawing being necessary. Or, a suitable manual lever may be used below table 45 to bring the upper mold form 35 down into interleaved position with the lower mold portion 25.

In another embodiment an air cylinder 150 is bolted to the table 45 and post 20 is threaded into the air-driven piston within cylinder 150. Above table 45, FIG. 2 is a sleeve 125 which encases post 20 and serves as a hard stop for the air driven cylinder 100 as collar 70 is lowered under pneumatic pressure to the top of sleeve 125.

For a typical 18 inch wreath machine 200, I have found suitable results by operating at about 30 pounds of air pressure for cylinder 150. If a regulator is used on an air tank or compressor, one does not need flow control valves. If such flow control valves are desired, they may be selected in any known fashion from fluid control system companies such as Parker Motion & Control, Cylinder Division of Des Plaines, Ill. or any other suitable source such as Miller Fluid Controls of Brensenville, Ill. or other similar supply houses.

Figure 6:
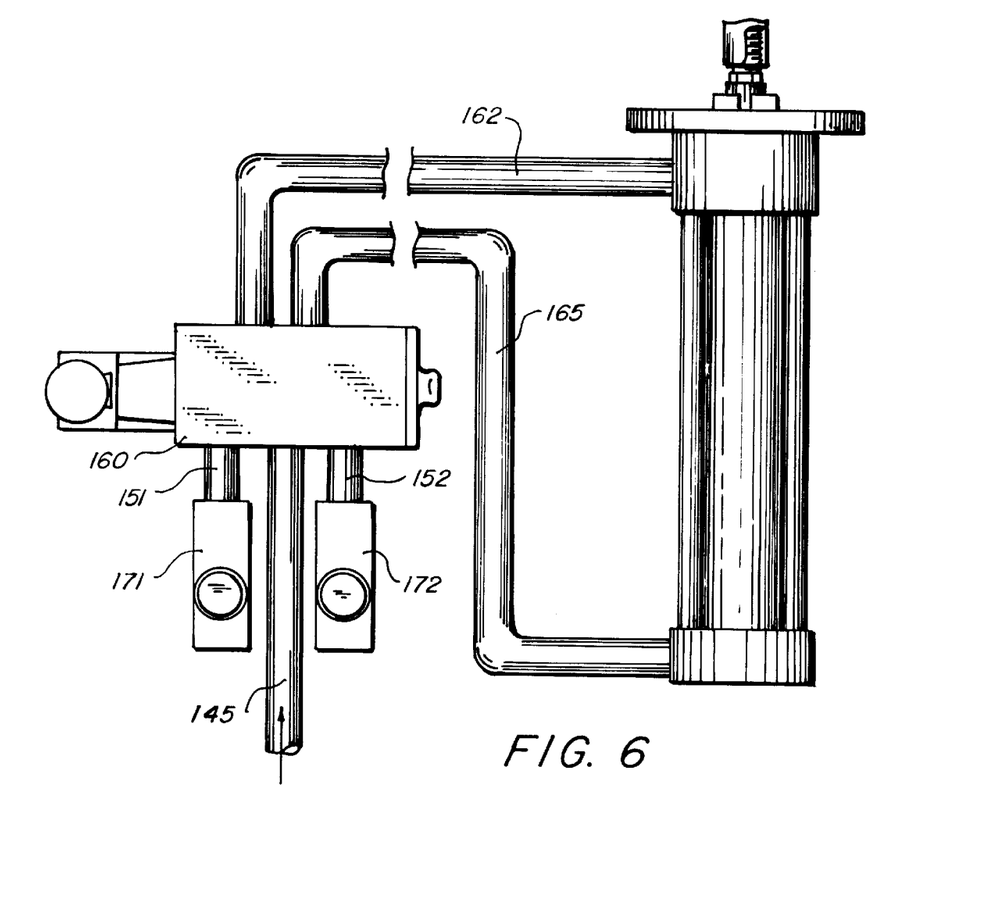
FIG. 6 depicts a rotary mold and a basic air driven system for control of the up/down movement for the upper mold form.

FIG. 6 depicts a basic air driven system for automatically controlling movement of post 20. The table 45 may be adapted for a rotary operation rather than being a fixed position table as described earlier for FIG. 2. In such a rotatable system, the branches may be inserted in branch holding openings 29A, 29B, etc. by simply turning table 45 in a well known and understood lazy susan fashion.

In FIG. 6 the pneumatic system, as shown, air is delivered at about 85 PSI from a source (not shown) which may be any suitable shop compressor or other air supply source. Obviously, the described manually operative post 20, or an oil or other hydraulic fluid system, is equally applicable for my invention. Driving air for piston 100 is supplied at line 145 that is connected to an air control valve 150, which valve may be mounted on the table 45, base plate 30 or the legs 36.

Air control valve 160, in one embodiment, was selected as a Parker Marathon "42" Series two position valve to control both of the up/down motions as pneumatically desired. Air inlet to cylinder 150 is via line 162 and a return line 165 is also provided to appropriate connections for a Parkers Series 2MA Air Cylinder 150.

Connected to the air control valve 150 by suitable stub connectors 151, 152 are flow control valves 171 and 172, which flow controls may be any suitable valves such as Parker Series F flow control valves. These flow regulators control the speed of the up and down movements of air driven post 20. The amount of compression is also suitably controlled for best wreath shape in the mold sections 25 and 35.

The method of this invention yields a totally bio-degradable natural material wreath made in a self-supporting manner by bough branches that are individually held by fingers forming a bough cradle in which such evergreen branches are overlaid with one another. Above the bough cradle are radially spaced bough compression arms that are controllably lowered such that the arms interleave with the fingers to compressively shape the wreath from the evergreen branches.

While such branches are under compression, the wreath shape is maintained by tying the wreath with bio-degradable twine at several spaced locations. These wreath ties may readily be looped around several overlaid branch stems while compressively held in place in the lower branch cradle 25. By using green jute twine the stems are tied securely one to the other while such stems are held by the branch openings 29A, 29B, etc. Such binding of self supporting branches takes place as necessary in the pie-shaped sections 40A, 40B, etc. between the interleaved arms and fingers 25, 35 as shown by the top view of FIG. 5.

After the wreath is suitably bound by bio-degradable twine, the post 20 is raised and upper compression arms are easily removed from the top of post 20. Such removal is facilitated by use of a by a quick disconnect pin 75 as described earlier herein. The formed and bound wreath is removed from the wreath mold where it is readily available for any further decoration as may be individually desired.

While my invention has been described with reference to a particular example of preferred embodiments, it is my intention to cover all modifications and equivalents within the scope of the following claims. It is therefore requested that the following claims, which define my invention, be given a liberal interpretation which is within the spirit and scope of my contribution to this art.

What is claimed is:

1. A method for compressively forming, in a separable mold formed by an upper compression section and a lower branch cradle section, cut evergreen branch boughs having a centrally oriented stem into a natural compact circular shaped wreath comprising the steps of:

securing said bough branches at their stems to stem-receiving openings provided in said lower branch cradle section, which cradle section is formed from a series of radially extending spokes emanating from a center hub;

over laying the stem-held branches in said lower branch cradle section;

compressing the natural evergreen branch boughs in said cradle section under compression by said upper compression section, which section also includes a series of radial compression spokes emanating from said hub and interleaved relative to the spokes of said branch cradle section;

binding the branch stems at spaces located between said interleaved spokes of said cradle section with a bio-degradable twine while the shaped wreath branch boughs are under compression between said upper compression and said lower cradle section; and cutting said branch stems at the stem holding openings of said lower cradle section after a wreath has been formed so that the formed and bound stems act as self-support for the formed wreath.

2. A method for compressively forming evergreen branch boughs into a compact circular shaped wreath in accordance with claim 1 and comprising the additional steps of:

first separating said upper and lower sections of said mold by removing said compression section from said hub; and loading said branches into said lower branch cradle section such that said branches may be secured in said stem-receiving openings in said lower cradle section as part of said branch over laying step.

3. A method for compressively forming evergreen branch boughs into a compact circular shaped wreath in accordance with claim 2 and comprising the additional steps of:

coaxially sliding said series of bough compression spokes of said upper compression section onto said common hub axis after said bough branches have been loaded into said lower branch cradle section and secured thereto by the branch stems in said stem-receiving openings; and controllably moving the upper compression section in an up/down direction along said hub axis in order to apply compression to said held branch boughs prior to said wreath binding step.

4. A method for compressively forming evergreen branch boughs into a compact circular shaped wreath in accordance with claim 1 and comprising the additional steps of:

moving said upper compression section either manually or pneumatically by an air driven cylinder into a compressive position against said overlaid branches in said branch cradle section in order to compressively form said wreath therein.

5. A method for compressively forming evergreen branch boughs into a compact circular shaped wreath having substantially rounded edges when a formed wreath is viewed in cross section, in accordance with claim 1 and comprising the additional steps of:

shaping the inner periphery of said open branch cradle section by inwardly sloped upstanding guide bars used to shape rounded edges at the bottom of the wreath; and providing an inclined upstanding guide bar on the outer periphery of said cradle, which bar in conjunction with a downwardly inclined bar of said compression section forms a rounded upper surface of said formed wreath.

6. A method for compressively forming cut evergreen branch boughs having a centrally oriented stem into a compact circular shaped wreath in a two-section separable mold formed by an upper compression section and a lower branch cradle section, said method comprising the steps of:

securing said bough branches at their stems to stem-receiving openings provided in said lower branch cradle section;

over laying the stem-held branches in said lower branch cradle section;

compressing the natural evergreen branch boughs in said cradle section under compression by said upper compression section;

binding the branch stems with a bio-degradable twine while the shaped wreath branch boughs are under compression between said upper compression and said lower cradle section; and cutting said branch stems away from the stem holding openings of said lower cradle section after a wreath has been formed.

7. A method for compressively forming evergreen branch boughs into a compact circular shaped wreath in accordance with claim 6 and comprising the additional steps of:

providing a small upstanding vertical post that defines a common hub for said two-section mold;

seating a circular mounting plate on the top of said vertical post;

mounting on said circular plate, above said branch bough cradle section, a series of downwardly curved compression arms which radiate outwardly from said post; and moving, during said compressing step, said compression arms either manually or pneumatically by a fluid driven cylinder into pressing contact with said branch boughs.

8. A method for compressively forming evergreen branch boughs into a compact circular shaped wreath in accordance with claim 7 and comprising the additional steps of:

extending the outermost ends of such compression arms such that they overlap and extend slightly beyond the outer periphery of the bough cradle section.

9. A method for compressively forming evergreen branch boughs into a compact circular shaped wreath in accordance with claim 8 and comprising the additional steps of:

relying, in a bound and formed wreath, upon the branches themselves for support rather than relying on any extra supporting ring or wreath support frame.

10. A method for compressively forming evergreen branch boughs into a compact circular shaped wreath in accordance with claim 8 and, after the branches have been tied and the branch stems have been cut from the branch holding openings, comprising the additional step of:

removing the compression arms from the post by means of a quick disconnect retaining pin so that the formed and bound wreath may be easily and readily removed from the wreath making mold.

* * * * *